United States Patent
Hoad

(10) Patent No.: US 6,793,964 B2
(45) Date of Patent: Sep. 21, 2004

(54) BITUMEN COATING OF PARTICULATE MATERIAL

(75) Inventor: Leslie Hoad, Cheshire (GB)

(73) Assignee: Totalfinaelf Bitumen Limited, Preston (GB)

( * ) Notice: Subject to any disclaimer, the term of this patent is extended or adjusted under 35 U.S.C. 154(b) by 0 days.

(21) Appl. No.: 10/168,834

(22) PCT Filed: Dec. 21, 2000

(86) PCT No.: PCT/GB00/04955
§ 371 (c)(1),
(2), (4) Date: Nov. 4, 2002

(87) PCT Pub. No.: WO01/48089
PCT Pub. Date: Jul. 5, 2001

(65) Prior Publication Data
US 2003/0134036 A1 Jul. 17, 2003

(30) Foreign Application Priority Data
Dec. 23, 1999 (GB) .............................................. 9930644

(51) Int. Cl.⁷ .............................. B05D 7/00; B01F 5/06
(52) U.S. Cl. .................... 427/212; 427/213.3; 427/215; 427/220; 366/336; 366/337; 366/338
(58) Field of Search ............................. 427/212, 213.3, 427/215, 220; 118/303, 24; 366/336, 337, 338, 339, 340

(56) References Cited
U.S. PATENT DOCUMENTS

| | | | |
|---|---|---|---|
| 2,459,520 A | 1/1949 | Greenshields | 106/283 |
| 2,717,869 A * | 9/1955 | Turner | 201/7 |
| 2,917,395 A * | 12/1959 | Csanyi | 106/122 |
| 4,056,641 A * | 11/1977 | Huschka et al. | 42/6 |
| 4,692,350 A | 9/1987 | Clarke et al. | 427/138 |
| 4,832,497 A * | 5/1989 | Wentzel | 366/9 |
| 5,211,985 A * | 5/1993 | Shirley et al. | 427/213 |
| 5,447,565 A * | 9/1995 | Song et al. | 118/17 |

FOREIGN PATENT DOCUMENTS

| | | | |
|---|---|---|---|
| DE | 2063043 | 7/1972 | |
| GB | 1325916 | 8/1973 | |
| GB | 1325916 A * | 8/1973 | C08H/13/00 |

* cited by examiner

Primary Examiner—Elena Tsoy
(74) Attorney, Agent, or Firm—Goodwin Procter LLP

(57) ABSTRACT

An apparatus for bitumen coating particulate material comprises a chamber (2) having baffles or deflectors (4), a particulate material inlet (8) and a particulate material outlet (10). In use, a foamed bituminus formulation is directed into the chamber via an outlet (12) and an air stream is directed from an inlet (14) towards the bituminous formulation, to atomise the formulation. The atomised formulation then contacts particulate material which passes in a convoluted path through the chamber via inlet (8). Prior to contact with the atomised bituminous formulation, heated air which passes into the chamber via a second gas inlet (16) heats the surface of the stone. After the particulate material has been coated it is discharged via outlet (10) for subsequent use.

17 Claims, 3 Drawing Sheets

BITUMEN COATING OF PARTICULATE MATERIAL

CROSS-REFERENCE TO RELATED APPLICATION

This application is a national phase application of International Application No. PCT/GB00/04955, which was filed on Dec. 21, 2000 and which published in English on Jul. 5, 2001, which in turn claims priority from U.K. Application No. GB 9930644.1, which was filed on Dec. 23, 1999.

The present invention relates to bitumen coating of particulate material and particularly, although not exclusively, relates to a method of and apparatus for bitumen coating particulate materials, for example stone.

Conventional methods for bitumen coating stone involve feeding particulate stone aggregate onto a conveyor and mixing the stone with a foamed bitumen binder. Suitable mixing methods include use of an archimedian screw apparatus set in a trough of a conveyor and/or use of a pugmill mixer. Methods of foaming bitumen binders are well known, and any suitable method can be used.

Use of a foamed bitumen binder aids the distribution of the binder throughout the particulate stone material. However, distribution of the binder is affected by variations in temperature and moisture content of the stone and variations in stone grading and its dust/filler content. For example, when foamed bitumen binder contacts cold stone, the foam rapidly collapses causing a decrease in the volume of the binder and "balling" which leads to poor distribution of the binder throughout the stone.

At relatively low temperatures, efficient binder distribution can be difficult with traditional mixers because binder flow over the surface of stone is a function of viscosity of the binder, which is related to temperature of the stone. Cold or low temperature coating requires a low viscosity binder, resulting in a correspondingly low stability of the final product, for example, when used as a pathway or roadway.

High stability of the final product can be achieved by use of a high viscosity binder. In order to effect appropriate binder flow, the binder is applied to hot graded stone. A bitumen formulation having a kinematic conventional viscosity range of 100–400 centistokes, would require the stone to be heated to around 120–180° C. However, heating of stone involves expensive and inefficient use of energy. Furthermore, stone dries out on heating and stone dust is released into the operating atmosphere. Such dust causes environmental and health and safety problems for the operators.

Specially formulated bitumen emulsions of low viscosity can be employed in cold stone coating. However, emulsions are not sufficiently adaptable and versatile to be useful in all stone coating techniques.

When using a bitumen emulsion to coat stone, the emulsion formulation and stone origin and characteristics, including water content, are important factors in determining the ease of production and the performance of the emulsion coated stone.

It is an object of preferred embodiments of the present invention to provide an improved method of and apparatus for bitumen coating particulate material.

SUMMARY OF THE INVENTION

The present invention provides a method of bitumen coating particulate material, wherein a foamed bitumen formulation is dispersed and contacted with particulate material to be coated.

The particulate material is preferably stone. The stone material may be the particulate stone material commonly known as "aggregate".

Any suitable means of contacting the particulate material and the bituminous formulation may be used. For example, the particulate material may be fed to a conventional archimedian screw apparatus and the bituminous formulation may be sprayed onto the particulate stone material as the particulate material passes through the archimedian screw apparatus.

An alternative, and preferred, embodiment of the present invention involves separating the particulate material and contacting the separated particulate material with the dispersed foamed bituminous formulation.

The foamed bitumen formulation is preferably contacted with said particulate material in a chamber. Said particulate material may be introduced into said chamber via an inlet, which is suitably at an upper end thereof. The temperature of the particulate material prior to introduction into said chamber may be less than 50° C., preferably less than 40° C., more preferably less than 30° C. Preferably, said particulate material is within about 10% of ambient temperature. Especially preferred is the case wherein said particulate material is at ambient temperature prior to introduction into said chamber. Advantageously therefore, said particulate material need not be heated prior to introduction into said chamber.

Preferably, the particulate material is arranged to flow in a convoluted flow path after introduction into said chamber and, suitably, before contact with said foamed bitumen formulation. Thus, components of the particulate material are preferably caused to move relative to one another and, more preferably, turbulent flow of the particulate material is effected as is passes to a region wherein it is contacted with said foamed bitumen formulation.

Preferably, in the method, components of the particulate material are caused to be separated slightly from one another prior to contact with said foamed bitumen formulation. Preferably, the particulate material is arranged to pass into or through said chamber under the influence of gravity to a region wherein it is contacted with said foamed bitumen formulation. Preferably, no other motive means for causing the particulate material to pass through said region is provided. Preferably, however, the method involves arresting the velocity of the particulate material as it passes towards and/or within said region. Preferably, the method may involve suspending particulate material in said region thereby to increase the time over which it may be contacted with said foamed bitumen.

The velocity of the particulate material may be arrested by one or more baffles arranged within said chamber. Alternatively and/or additionally, the method may involve directing a fluid into said chamber in order to arrest the velocity and/or suspend the particulate material in said chamber. Preferably, said fluid is a gas (which term includes steam), more preferably, it is air.

Suitably, the particulate material remains in said region for a period of time sufficient to enable a proportion of the particulate material, preferably the majority of the particulate material and more preferably substantially all of the particulate material, to be contacted by the dispersed, foamed bituminous formulation.

Suitably, the particulate material is maintained in said region for an average period of at least 5 seconds, preferably at least 10 seconds, more preferably at least 15 seconds and especially at least 20 seconds. Suitably, the particulate stone material is maintained in said region for an average period of less than 120 seconds, preferably less than 80 seconds, more preferably less than 60 seconds and especially less than 45 seconds.

Different sized particles of particulate material may pass at different rates through the region wherein the material is contacted with the foamed bitumen formulation.

The method may include applying heat to the particulate material within said chamber (when provided), preferably within a region wherein it is contacted with said foamed bitumen formulation. Heat may be applied when it is contacted with said foamed bitumen. Heat may be applied to raise the temperature of the surface of the particulate material, suitably, to enable foamed bitumen to flow over the particulate material more easily. Internal regions of the particles of particulate material need not be heated, thereby saving energy. Thus, surfaces of components of the particulate material may be at a higher temperature than internal regions thereof.

Heat may be applied to the particulate material by means of a heated fluid. Preferably, said fluid is a gas (which term includes steam); more preferably, it is air. Where the method involves directing a fluid into a said chamber in order to arrest the velocity and/or suspend the particulate material in the chamber, the same fluid may be heated and may therefore also apply heat to the particulate material as described.

The heated fluid may have a temperature of at least 25° C., suitably at least 40° C., preferably at least 60° C. and more preferably at least 80° C. The heated fluid may have a temperature of less than 170° C., suitably less than 150° C., preferably less than 130° C. and more preferably less than 120° C.

Suitably, the foamed bituminous formulation becomes dispersed as it passes into the chamber. Preferably, the foamed bituminous formulation is dispersed before it contacts the particulate material.

Suitably, the foamed bituminous formulation is dispersed by means of a dispersion process. The dispersion process may involve forcing the foamed formulation though an opening.

The dispersion process may involve contacting the foamed formulation with a dispersing fluid stream. Preferably, the dispersing fluid stream contacts the foamed bituminous formulation after the formulation has passed into the chamber.

The bituminous formulation and the dispersing fluid stream may issue from the same or from separate openings. Preferably, they issue from separate openings.

Preferably, dispersion of the foamed bituminous formulation involves atomisation of the foamed bituminous formulation.

Suitably, the dispersing fluid is at a temperature above ambient when it disperses the foamed bitumen formulation. The temperature of the dispersing fluid when it disperses the foamed bitumen formulation is suitably, at least 25° C., preferably at least 40° C., more preferably at least 60° C. and especially at least 80° C. The temperature of the dispersing fluid is suitably less than 170° C., preferably less than 150° C., more preferably less than 130° C. and especially less than 120° C.

Preferably, the dispersing fluid used to atomise the bituminous formulation is air. However, any suitable fluid may be used, For example, steam could be used as the dispersing fluid. In this case, the temperature of the atmosphere in the chamber is preferably between 120–150° C. to prevent condensation of the steam in the chamber.

The dispersing fluid may also provide the fluid that arrests the velocity of and/or suspends the particles when in the chamber. Furthermore, the dispersing fluid may also provide the heated fluid that heats the surface of the particulate material. Then, preferably, in the method a single source of fluid is arranged to contact the foamed bituminous formulation to disperse it and/or to suspend particulate material and/or to heat the particulate material.

Suitably, the foamed bituminous formulation comprises at least 50 wt %, suitably at least 55 wt %, preferably at least 60 wt %, more preferably at least 65 wt % bitumen. Said formulation may include 95 wt % or less, suitably 90 wt % or less, preferably 85 wt % or less, more preferably 80 wt % or less of bitumen.

The foamed bituminous formulation may include at least 10 wt %, preferably at least 15 wt %, more preferably at least 20 wt % water. The foamed bituminous formulation may include 45 wt % or less, suitably 40 wt % or less, preferably 35 wt % or less, more preferably 30 wt % or less of water.

The foamed bituminous formulation may have a pH of at least 1, preferably at least 1.5. The pH may be 5 or less, suitably 4.5 or less, preferably 4.0 or less, more preferably 3.5 or less. The foamed bituminous formulation may include an inorganic acid for adjusting the pH. Alternatively, an anionic formulation may be prepared using a sodium hydroxide pH balanced aqueous phase so that the finished foamed formulation has a pH in the range about 11–12.

The foamed bituminous formulation preferably includes one or more surface active agents, for example emulsifiers and/or adhesion agents. The total amount of surface active agents present in said foamed formulation may be at least 0.1 wt %, preferably at least 0.15 wt %, more preferably at least 0.20 wt %. The total amount may be less than 2 wt %, preferably less than 1.5 wt %, more preferably less than 1.0 wt %, especially less than 0.8 wt %.

The foamed bituminous formulation may be anionic, cationic or non-ionic in nature and said surface active agents may be selected accordingly. Preferred surface active agents are amines, for example N-alkyl tallow 1,3-propylene diamine, derivatives of tallow propylene diamine and associations of alkylamido polyamines and alkyl imidazo polyamines, and lignosulphonates.

The surface active agents may be primarily for maintaining the stability of a bitumen/water emulsion formulation. However, the presence of suitable surface active agents may enhance the end performance of the formulation by, for example, aiding stone coating and cohesion in low temperature techniques. Alkylamidoamines/polyethylene polyamine combinations and lignosulphonates may be particularly useful in this regard.

The foamed formulation may include a modifying means for modifying the properties of the bitumen. Preferred modifying means may be organic polymers or copolymers, for example styrene-butadiene polymer, styrene-butadiene-styrene copolymer, ethylene vinyl acetate polymer, and oils, for example tall oils and/or any of the individual constituents thereof.

Where a modifying means is provided in the formulation, said formulation may contain less than 7 wt %, suitably less than 6 wt %, preferably less than 4 wt %, more preferably less than 3 wt %, especially 2 wt % or less of said modifying means.

The foamed bituminous formulation may include flux oils (volatile or non-volatile), for example in the event that the foam is to be used as a means of reactivating residual bitumen in recycled road materials.

The foamed bituminous formulation may be in the form of an emulsion.

Any suitable method of providing a foamed bituminous formulation may be used. For example, UK Patent No. GB 1 325 916 and co-pending UK Patent Application No. 9910643.7 disclose suitable methods.

Particulate material coated in the method may be discharged to a storage means or directly onto a surface to which the coated material is to be applied.

The coated particulate material may be passed through a plurality of chambers arranged in series such that the particulate material is subject to a plurality of coating processes.

As a further alternative, or in addition to the latter, the coated particulate material may be subjected to a mixing process, in order to improve the distribution of bituminous formulation throughout the particulate material.

The mixing process may be carried out at ambient temperature. Alternatively, the mixing process may be carried out at a temperature above ambient temperature.

The method of the present invention may be carried out on a continuous or batch basis.

The present invention further provides apparatus for bitumen coating particulate material, comprising a chamber, having a particulate material inlet, a foamed bituminous formulation feed means arranged to feed foamed bituminous formulation into the chamber, and dispersion means arranged to disperse the foamed bituminous formulation.

The dispersion means may comprise a first fluid inlet for supplying a fluid into the chamber for dispersing said formulation in the chamber. Suitably, the first gas inlet is arranged relative to the bituminous formulation feed means, such that the bituminous formulation is dispersed after it issues from the feed means by fluid passing into the chamber via said first gas inlet. Preferably, the first gas inlet comprises a nozzle.

The bituminous formulation feed means may comprise a single outlet. Alternatively, the foamed bituminous formulation feed means may comprise a plurality of outlets. Suitably, the foamed bituminous formulation feed means comprises a nozzle.

If the foamed bituminous formulation outlet comprises a plurality of outlets, preferably, each outlet has an associated first gas inlet arranged to disperse bitumen formulation as described.

Preferably each foamed bituminous formulation feed means outlet and associated first gas inlet is separate from one another. Alternatively, each foamed bituminous formulation outlet and corresponding first gas inlet may be provided by a single nozzle.

The chamber may comprise a second gas inlet and a gas outlet. Preferably, the second gas inlet is located below the gas outlet when in use. Preferably, the second gas inlet is arranged for passage of gas flowing therethrough upwards through the chamber before exiting via the gas outlet, when in use.

An interior surface of the chamber may comprise one or more baffles or deflectors. The baffles or deflectors are suitably arranged to extend across a proportion of the width of the chamber.

The baffles may be of different lengths. For example, longer baffles may be provided to deflect the particulate material as it passes through the chamber. Shorter baffles may be provided to arrest particulate material velocity as it passes though the chamber. Baffles located in the region of the second gas inlet may be arranged to define a turbulence chamber. Baffles and deflectors above and below the second gas inlet may be arranged to cause a region of turbulent gas flow therebetween.

The presence of baffles or deflectors in the chamber may aid the mixing of the particulate material and the foamed bituminous formulation and thereby improve the coating of bituminous formulation on the particulate material.

Suitably, the foamed bituminous formulation feed means and the dispersion means are situated in the region of the turbulence chamber. The one or more foamed bituminous formulation feed means and the associated first gas inlets are preferably located substantially opposite the second gas inlet.

A hopper device may be arranged to feed the particulate material into the chamber.

Suitably, the chamber comprises a particulate material outlet.

The apparatus may comprise further mixing means, preferably arranged downstream of the outlet of the chamber. A suitable further mixing means is an archimedian screw apparatus mounted in a trough of a conveyor.

The apparatus of the present invention may comprise a plurality of chambers arranged in series. In this case, the plurality of chambers may be connected by particulate material feed means.

Preferred embodiments of the present invention advantageously provide an improved method, carried out at or around ambient temperature, of bitumen coating particulate material using a foamed bituminous formulation. The foamed state of the bituminous formulation may be prolonged and advantageously the contact of the foamed bituminous formulation with the particulate material may be improved.

Preferred embodiments of the present invention advantageously provide a bitumen coated particulate material of improved quality and performance. Furthermore, the method described may be more cost effective and environmentally friendly than prior art methods.

The method and/or approach described herein can advantageously be used to re-cycle stone which has been recovered from roads and the like during repair processes. In this case, the dispersed bituminous formulation may adhere to the bitumen already present on the recycled stone.

The fact that the bulk of the particulate material need not be heated may be particularly advantageous if the particulate material is a stone material. Conventionally, heating and consequential drying of stone causes dust particles to be released into the operating atmosphere. Stone processed in a method and/or apparatus described herein can be maintained at substantially ambient temperature or only the outer surface of the stone need by heated. Therefore, this effect can be reduced.

BRIEF DESCRIPTION OF THE DRAWINGS

The present invention will now be illustrated, by way of example only, with reference to the following drawings, in which.

DETAILED DESCRIPTION OF THE INVENTION

Figure 1:
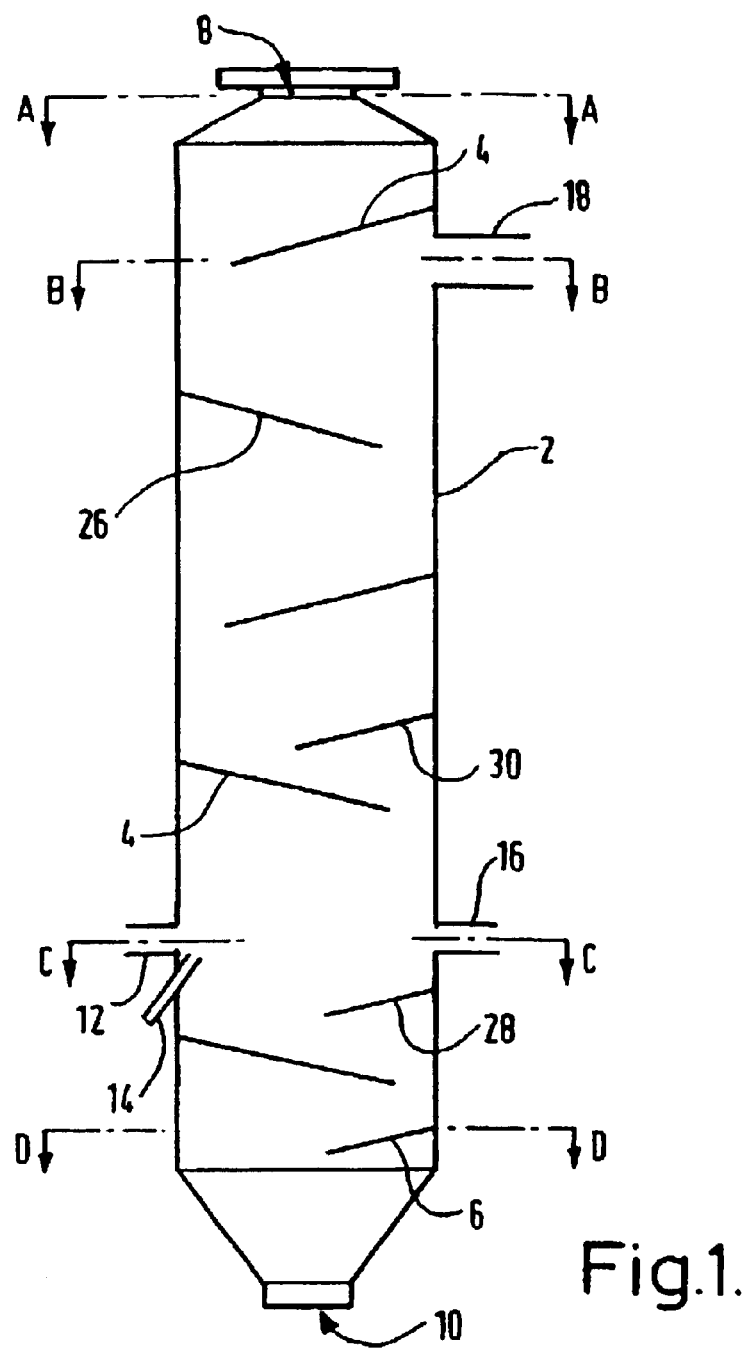
FIG. 1 shows a diagrammatic vertical cross section through stone coating apparatus.
Figure 1:
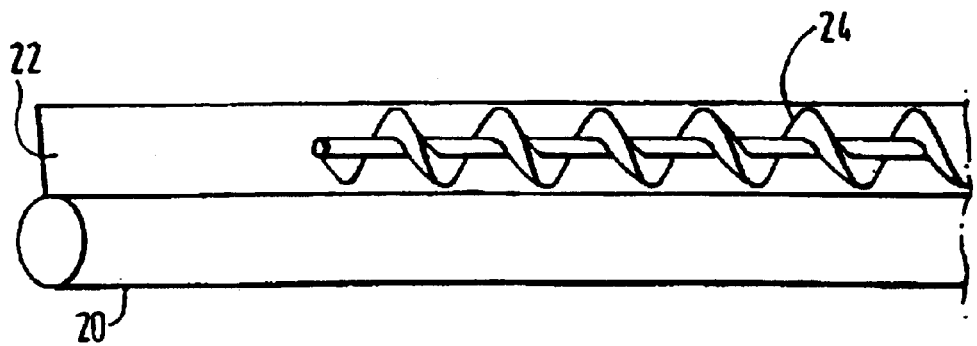
Figure 2:
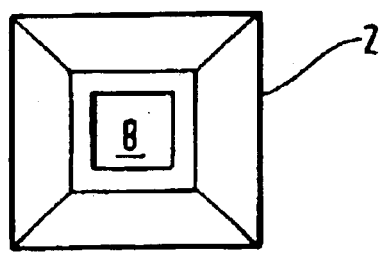
FIG. 2 shows a cross-section along line A—A of FIG. 1.
Figure 3:
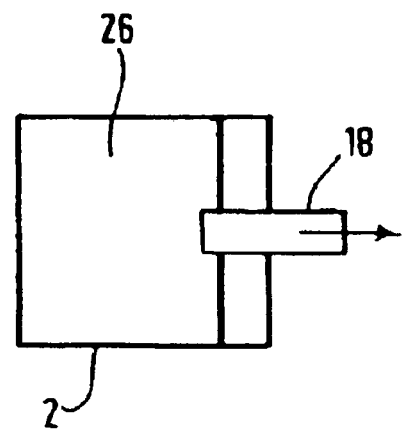
FIG. 3 shows a cross-section along line B—B of FIG. 1.
Figure 4:
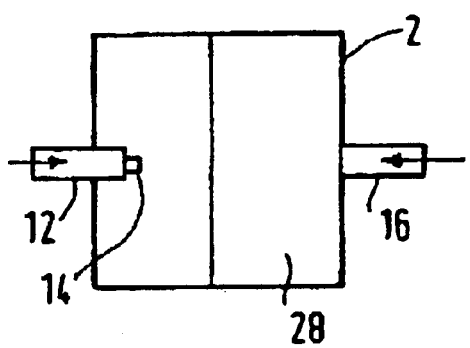
FIG. 4 shows a cross-section along line C—C of FIG. 1.
Figure 5:
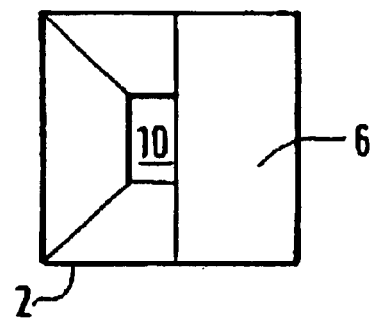
FIG. 5 shows a cross-section along line D—D of FIG. 1.

The apparatus of the figures comprises a chamber 2 having an elongate, tubular configuration and comprising a series of baffles or deflectors 4, which baffles or deflectors 4 extend across a proportion of the chamber 2. Different baffles have different lengths. For example, the bottom baffle or deflector 6 is shorter than most of the other baffles 4.

The chamber 2 has a particulate material inlet 8 and a particulate material outlet 10. The chamber 2 also comprises a foamed bituminous formulation outlet 12, a first air inlet 14, a second air inlet 16 and a waste gas outlet 18.

The second gas inlet 16 is located substantially level with and substantially opposite the bituminous formulation outlet 12 and the first gas inlet 14.

The waste gas outlet 18 is situated towards the upper end of the chamber, above the second gas inlet 16.

The chamber 2 is about 15 ft long and has a 3 ft square cross section along the majority of the length.

The particulate material inlet 8 comprises a 12 inch square, flanged opening. The bituminous formulation outlet 12 is provided by a 3 inch diameter pipe. The first air inlet 14 is provided by a 1 inch diameter pipe and the second gas inlet 16 is provided by a 3 inch diameter pipe. The particulate material outlet is provided by a 12 inch square opening. The waste gas outlet 18 is provided by a piece of 6 inch diameter pipe. Pipe diameters given herein are by way of example only. They may be changed as required to accommodate the particular materials and throughput of materials being used.

The short baffle 28 located below the second gas inlet 16 acts to arrest the stone velocity at it passes through the chamber 2 and assist in continuous flow of the coated stone to discharge.

The short baffle 30 above the second gas inlet 16 acts to arrest stone velocity and deflect stone into the region in which the dispersed, foamed bituminous formulation contacts the stone.

The opening of the first air inlet 14 is located in the region of the opening of the bituminous formulation outlet 12, such that on issue from the bituminous formulation outlet 12, the bituminous formulation is dispersed by the air issuing from the first air inlet 14.

Arranged below the particulate material outlet 10 is a conveyor 20, having a sidewall 22 to provide a trough. Arranged above the upper surface of the conveyor 20 in the trough provided by the side walls and the conveyor, is an archimedian screw mixer 24.

Figure 6:
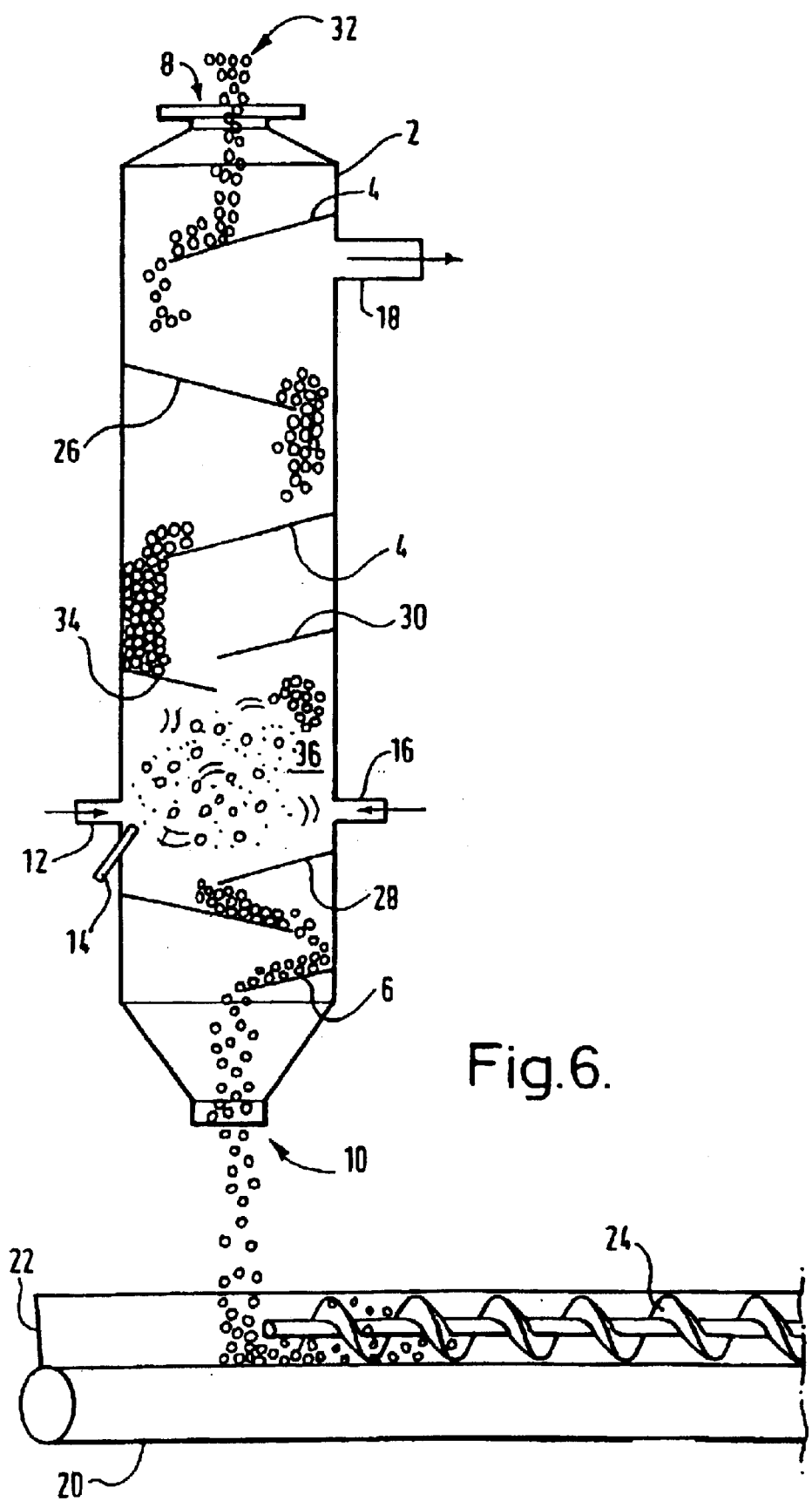
FIG. 6 shows the apparatus of FIG. 1 in operation.

In use of the apparatus of the figures, particulate stone material 32 (as shown in FIG. 6) is fed into the chamber 2 through the particulate material inlet 8. The particulate stone 32 passes downwards through the chamber 2 under the influence of gravity.

The baffles 4, 6, 26, 28, 30 deflect the path of the particulate stone 32 as it passes through the chamber 2. This deflection causes a reduction in the flow rate of stone 32 through the chamber 2 and separates the particles as they fall.

Air is pumped into the chamber 2 through the second gas inlet 16. The air entering through second gas inlet 16 travels in a generally upwardly direction and exits the chamber 2 via waste gas outlet 18. The arrangement of baffles 30, 34 cause turbulent flow of the air in the region of the chamber 2 between the baffles 28 and 34 at least. The temperature of the air entering through the second gas chamber is suitably in the range of 80–120° C.

Foamed bituminous formulation is fed into the turbulence chamber 36 via outlet 12 and warm air, at a temperature in the range of 25–170° C., is simultaneously fed into the turbulence chamber 36 via first air inlet 14.

Simultaneous emission of foamed bituminous formulation and air from the first air inlet 14 into the turbulence chamber 36 causes atomisation of the foamed bituminous formulation.

In the turbulence chamber 36 there is a mixture of particulate stone, atomised foamed bituminous formulation and turbulent air. This mixture remains in the turbulence chamber 36 for about 10–30 seconds to ensure that a proportion at least of the particulate stone 32 is coated with the atomised foamed bituminous formulation.

In order to effect a better distribution of bitumen binder throughout the particulate stone material, the stone is discharged through the particulate material outlet 10 onto the conveyor 20. The mixture then passes through an archimedian screw mixer 24, to effect this improved distribution of the bituminous formulation throughout the particulate stone.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method of bitumen coating particulate material, wherein particulate material to be coated is introduced into a chamber and arranged to flow in a convoluted flow path and a foamed formulation is dispersed by forcing the formulation through an opening into an application zone of the chamber where the formulation contacts said particulate material to be coated, wherein the method involves directing a fluid, separately from the formulation, into the application zone via a gas inlet, to arrest the velocity of the particulate material in the chamber.

2. A method according to claim 1, wherein components of the particulate material are caused to be separated slightly from one another prior to contact with said toned bitumen formulation.

3. A method according to claim 1, which includes applying heat to the particulate material.

4. A method according to claim 3, wherein heat is applied to raise the temperature of a surface of the particulate material to enable foamed bitumen to flow over the particulate material more easily.

5. A method according to claim 3, wherein heat is applied to the particulate material by means of a heated fluid.

6. A method according to claim 5, wherein said heated fluid has a temperature of at least 40° C.

7. A method according to claim 1, wherein the foamed bitumen formulation is dispersed by means of a dispersion process which involves contacting the foamed formulation with a dispersing fluid stream.

8. A method according to claim 7, wherein said dispersing fluid stream is at a temperature above ambient temperature when it disperses the foamed bitumen formulation.

9. A method according to claim 1, wherein dispersion of the foamed bitumen formulation involves atomisation thereof.

10. A method according to claim 1, wherein said particulate material is arranged to pass into or through said chamber under the influence of gravity to a region wherein it is contacted with said foamed bitumen formulation.

11. A method according to claim 1, wherein the velocity of the particulate material is arrested by one or more baffles arranged within said chamber.

12. A method according to claim 1, wherein the same fluid is used to (a) arrest the velocity of the particulate material in the chamber or suspend the particulate material in the chamber and (b) apply heat to the particulate material.

13. A method according to claim 1, wherein particulate material to be coated is arranged to pass through said chamber under the influence of gravity to a region wherein it is contacted with said foamed bitumen formulation; wherein the velocity of the particulate material is also crested by one or more baffles arranged within the chamber; wherein heat is applied to raise the temperature of a surface of the particulate material to enable foamed bitumen to flow over the particulate material more easily, and wherein said fluid directed into the chamber to arrest the velocity is at a temperature of at least 40° C. in order both to arrest said velocity and apply heat to raise the temperature of a surface of said particulate material.

14. A method according to claim 13, wherein said foamed bitumen formulation is further dispersed by contacting it, alter it has passed into said chamber, with a dispersing fluid which is at a temperature of at least 40° C. when it disperses the foamed bitumen formulation.

15. A method according to claim 1, wherein said foamed bitumen formulation is further dispersed by contacting it, after it has passed into said chamber, with a dispersing fluid.

16. A method according to claim 15, wherein said dispersing fluid is at a temperature of at least 40° C. when it disperses the foamed bitumen formulation.

17. A method according to claim 1, wherein said chamber includes: baffles or deflectors for causing said particulate material to flow in a convoluted flow path; a first gas inlet via which a fluid passes into the chamber and causes said foamed bitumen formulation to be dispersed; and a second gas inlet via which said fluid which arrests the velocity of the particulate material in said chamber passes into the chamber before exiting the chamber via a gas outlet located above the second gas inlet.

* * * * *